(12) United States Patent
Danielli et al.

(10) Patent No.: US 6,526,672 B1
(45) Date of Patent: Mar. 4, 2003

(54) HEAD FOR THE LINEAR DIMENSION CHECKING OF MECHANICAL PIECES

(75) Inventors: Franco Danielli, Zola Predosa (IT); Roberto Baruchello, Baricella (IT)

(73) Assignee: Marposs Societa' per Azioni, Bentivoglio (IT)

( * ) Notice: Subject to any disclaimer, the term of this patent is extended or adjusted under 35 U.S.C. 154(b) by 0 days.

(21) Appl. No.: 09/762,190

(22) PCT Filed: Aug. 27, 1999

(86) PCT No.: PCT/EP99/06305

§ 371 (c)(1),
(2), (4) Date: Feb. 5, 2001

(87) PCT Pub. No.: WO00/17602

PCT Pub. Date: Mar. 30, 2000

(51) Int. Cl.$^7$ .............................. G01B 3/00; G01B 5/00
(52) U.S. Cl. .............................. 33/561; 33/558; 33/556
(58) Field of Search ........................ 33/556, 558, 559, 33/561

(56) References Cited

U.S. PATENT DOCUMENTS

| | | | |
|---|---|---|---|
| 4,187,614 A | | 2/1980 | Abiru et al. |
| 4,530,160 A | | 7/1985 | Feichtinger |
| 5,299,360 A | * | 4/1994 | Possati et al. ............... 33/559 |
| 5,394,618 A | * | 3/1995 | Morz ........................... 33/556 |
| 5,634,280 A | * | 6/1997 | Hellier et al. ............... 33/556 |
| 5,659,969 A | * | 8/1997 | Butler et al. ................ 33/556 |
| 5,746,003 A | * | 5/1998 | Baruchello .................. 33/556 |
| 5,755,038 A | * | 5/1998 | McMurty ..................... 33/556 |
| 5,806,201 A | * | 9/1998 | Feichtinger ................. 33/556 |
| 6,370,788 B1 | * | 4/2002 | Hellier et al. .............. 33/556 |

FOREIGN PATENT DOCUMENTS

GB 2 208 934 4/1989

* cited by examiner

*Primary Examiner*—Diego Gutierrez
*Assistant Examiner*—Yaritza Guadalupe
(74) *Attorney, Agent, or Firm*—Dickstein Shapiro Morin & Oshinsky LLP

(57) ABSTRACT

A head for the linear dimension checking of mechanical pieces, including a casing that defines a longitudinal geometric axis, an arm—set movable with respect to the casing, a feeler coupled to the movable arm—set for touching the piece to be checked, a biased device arranged between the casing and the movable arm—set for urging the movable arm—set into contact with the casing, a detecting device coupled to the casing, including a movable element and a transmission device between the movable arm—set and the movable element of the detecting device. In order to reduce the frictions and improve the repeatability of the head, the transmission device includes a wire substantially rigid in a longitudinal direction but flexible in the direction perpendicular to the longitudinal direction. The wire has a first end coupled to the movable arm—set and a second end for cooperating with the movable element of the detecting device.

25 Claims, 8 Drawing Sheets

HEAD FOR THE LINEAR DIMENSION CHECKING OF MECHANICAL PIECES

TECHNICAL FIELD

The present invention relates to a head for the linear dimension checking of mechanical pieces, including a casing, that defines a longitudinal geometric axis, an arm-set, movable with respect to the casing, a feeler, coupled to the movable arm-set, for touching the piece to be checked, a bias device, arranged between the casing and the movable arm-set, a detecting device, coupled to the casing, including a movable element, and a transmission device, between the movable arm-set and the movable element of the detecting device, including a wire, substantially rigid in said longitudinal direction but flexible in the directions perpendicular to the longitudinal direction, the wire having a first end coupled to the movable arm-set and a second end for cooperating with the movable element of the detecting device.

BACKGROUND ART

Contact detecting and measuring heads are known from U.S. Pat. No. 5,299,360.

The mechanic structure of these heads, based on a coupling between the movable arm-set and the casing, achieved by means of a first constraining system substantially of the cone-ball type and a second constraining system for preventing rotations of the movable arm-set about the longitudinal geometric axis, and on the presence of two annular facing surfaces adapted to enter into a substantially point-to-point contact, guarantees good repeatability.

However, in some applications, it is required that the repeatability errors be as small as possible, considerably smaller than 1 μm.

The repeatability errors are mainly due to the effects of frictions among reciprocally moving parts, to shape errors of elements of the head, and to vibrations due to shock waves or other dynamic phenomena.

This is particularly true with regard to the detecting device and its arrangement in the head. More specifically, a detecting device disclosed in U.S. Pat. No. 5,299,360 includes a microswitch with a stem having an end adapted for contacting the movable arm-set. This contact may involve slidings and thus repeatability errors. Moreover, as the stem of the microswitch is not constrained with respect to rotations about its axis, and it is possible that there may be errors in the shape of the stem, other repeatability errors may consequently possibly arise.

From the article "Multi-directional probe" published on pages 7 and 8 of the publication "Technical Digest No. 6, April 1967" of the American company Western Electric, there is known a measuring probe with a housing, that defines a frusto-conical cavity, a position transducer measuring device fixed at the interior of the housing, and a movable arm-set with shaped portions for providing contact and a frusto-conical portion for cooperating with the frusto-conical cavity of the housing. The measuring device includes a movable element coupled to an end of a wire, axially rigid but flexible in transversal directions. The other end of the wire is connected to the movable arm-set. Moreover, the measuring device includes means, not shown, that presumably consist of an internal spring, that, by means of the movable element and the wire, urge the frusto-conical portion of the movable arm-set towards the frusto-conical cavity of the housing.

Therefore, the wire is subject to a compressive stress of a considerable entity, owing to the fact that it has to apply force for causing contact between the movable portion of the arm-set and the cavity of the housing. Consequently, problems arise insofar as the dimensions of the section of the wire are concerned, because of the contrasting requirements of providing resistance to a considerable compressive stress on the one hand and achieving good lateral flexibility on the other. Moreover, even the frictional forces acting on the wire necessarily have relatively high values.

A tracer head including a wire (or rod spring) and the 10 other features according to the technical field of the present invention is shown in U.S. Pat. No. 4,187,614. This head includes a stylus adapted to touch a model surface and a tracer shaft carrying the stylus. The shaft includes a rigid portion and a rod spring portion, respectively coupled to a casing by means of a first and a second mutually parallel planar springs. Axial and radial movements of the stylus are transmitted to an axial and, thanks to the bending of the rod spring, two radial displacement detectors coupled to the casing. The connection of the shaft by means of the two planar springs causes a compression action on the rod spring, in particular when the stylus touches the model surface, with consequent problems, e.g. in connection with the choice of its sectional dimensions, as cited above with reference to the article "Multi-directional probe".

DISCLOSURE OF INVENTION

Object of the present invention is to provide a checking head in which the component of the repeatability error due to the detecting device is particularly small.

This and other objects are achieved by a checking head of the herein described type in which the bias device is arranged in such a way that it urges the movable arm-set into contact with the casing and does not apply a compressive stress onto the wire of the transmission device.

The invention enables to achieve negligible frictional forces in the transmission device and in the detecting device, avoid problems insofar as the design sizes of the transmission device are concerned and, in conclusion, considerably improve the head repeatability.

BRIEF DESCRIPTION OF THE DRAWINGS

Other objects and advantages of the invention or of specific embodiments of the invention will appear from the following detailed description that refers to preferred embodiments illustrated in the enclosed sheets of drawings, given by way of non limiting example, wherein.

BEST MODE FOR CARRYING OUT THE INVENTION

Figure 1:
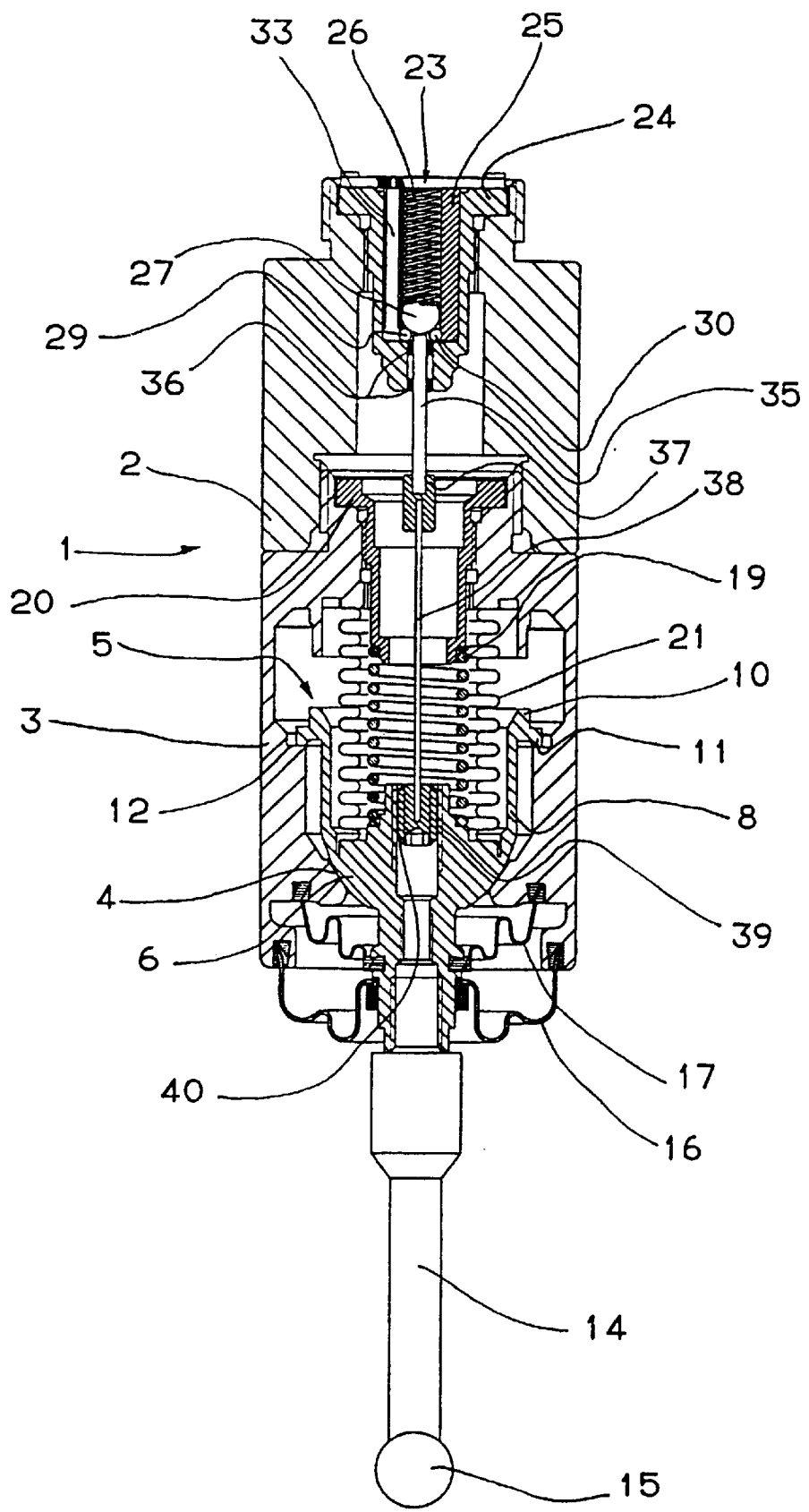
FIG. 1 is a longitudinal cross-sectional view of a contact detecting head according to a first embodiment of the invention.

The contact detecting head shown in FIG. 1 includes a casing 1, with a substantially cylindrical shape, consisting of two superimposed portions 2 and 3, coupled by means of a threaded coupling, that define a longitudinal geometric axis.

In the lower part of portion 3 there is a seat 4 with a substantially frusto-conical surface.

The movable arm-set 5 of the head includes a reference element 6 with a surface having substantially the shape of a spherical zone for engaging with seat 4, a hollow portion 8, with a substantially cylindrical shape, integral with the reference element 6, and an upper flange 10, integral with the hollow portion 8, that has an annular portion 11 protruding downwards.

When movable arm-set 5 is in the position shown in FIG. 1, i.e. symmetric with respect to the longitudinal geometric axis defined by casing 1, annular portion 11 is at a distance of a few micrometers from a corresponding stationary annular surface 12 formed in a plane recess of portion 3.

This clearance, that is not visible in the figure, is fundamental for the repeatability of the head.

Furthermore, movable arm-set 5 includes an arm 14 with a feeler 15.

Between arm 14 and portion 3 there are two flexible, sealing and protection elements 16 and 17.

A helical spring 19 has its ends abutting against two plane surfaces formed in reference element 6 and in an abutment element 20 integral with portion 3 of casing 1 and urges the spherical part of reference element 6 towards seat 4. As disclosed in patent U.S. Pat. No. 5,299,360, to which reference is made for any further explanation, the herein described coupling between movable arm-set 5 and casing 1 is adapted to eliminate three degrees of freedom of movable arm-set 5. Another degree of freedom, that relates to rotations of movable arm-set 5 about the longitudinal geometric axis defined by casing 1, is eliminated by a metal bellows 21, that houses spring 19 at the interior and has its ends secured to the plane surface of reference element 6 and to another transversal surface of portion 3.

The contact occurring between feeler 15 and a piece is detected, subsequently to a determinate pre-stroke in a longitudinal direction or, in the case of displacements of feeler 15 in a transversal direction, at a determinate angle between the longitudinal geometric axis of casing 1 and the geometric axis of arm 14, by means of a detecting device that includes a microswitch 23.

The microswitch 23 includes a casing 24 with an insulating, cylindrical element 25 that houses a spring 26 for urging a movable element, more specifically a small ball 27, made of electrically conducting material, into contact with two small bars 29 and 30, also made of electrically conducting material, secured to insulating element 25 at a lower base of casing 24.

When small ball 27 contacts bars 29 and 30, microswitch 23 is closed, whereas when ball 27 disengages from at least one of bars 29 and 30, microswitch 23 opens. An external circuit, not shown in the drawings, is connected to bars 29 and 30 by means of conductors, not shown in the drawings, that traverse a longitudinal opening 33.

Furthermore, microswitch 23 includes a stem 35, axially guided by means of two sapphire bushings 36 fixed to casing 24 near contact bars 29 and 30. The lower end of stem 35 is secured at the top of a coupling element 37 that has its lower part secured to the upper end of a flexible wire 38. The lower end of wire 38 is secured, by means of an insulating bushing 39, to a coupling and adjustment, threaded dowel 40, that is centrally coupled, by means of a frictional coupling, to the upper part of reference element 6.

The wire 38 is made of spring steel and can be, for example, 20 mm long and have a diameter of 0.4–0.5 mm. When feeler 15 is not subject to contact forces with a piece, the upper end of stem 35 is at a short distance from ball 27. Upon contact with the piece, wire 38 transmits an upward displacement to stem 35, and the latter contacts—after a determined amount of pre-stroke—small ball 27 and causes it to disengage from bars 29 and 30, overcoming the force applied by spring 26, that is relatively small with respect to that applied by spring 19.

Owing to the amount of the involved forces and the dimensions of wire 38, the latter is rigid with respect to axial forces, while can deflect in a transversal direction because of the transversal forces that are generated as a consequence of contact occurring between feeler 15 and the piece in a transversal direction.

From the foregoing description, it is obvious that, because the coupling device comprising wire 38 and stem 35 is coupled to movable arm-set 5, it is also subject to the constraint of bellows 21.

Furthermore, the frictional forces acting in microswitch 23 and in the coupling device are low in number and value. Hence, the contribution to the repeatability error of the head provided by microswitch 23 and the coupling device is relatively small (in the range of 0.05–0.1 m).

Figure 2A:
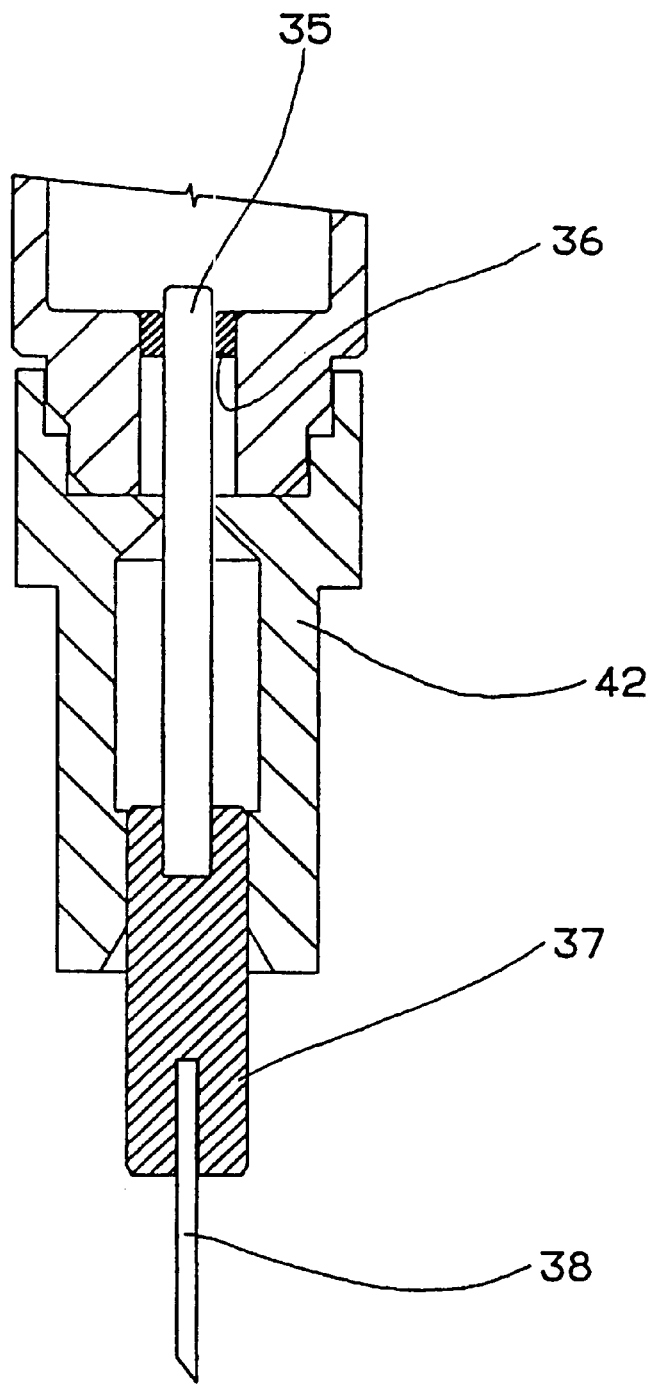
FIGS. 2a, 2b and 2c are enlarged scale, longitudinal cross-sectional views of a detail of the head of FIG. 1 according to three possible variants.
Figure 2B:
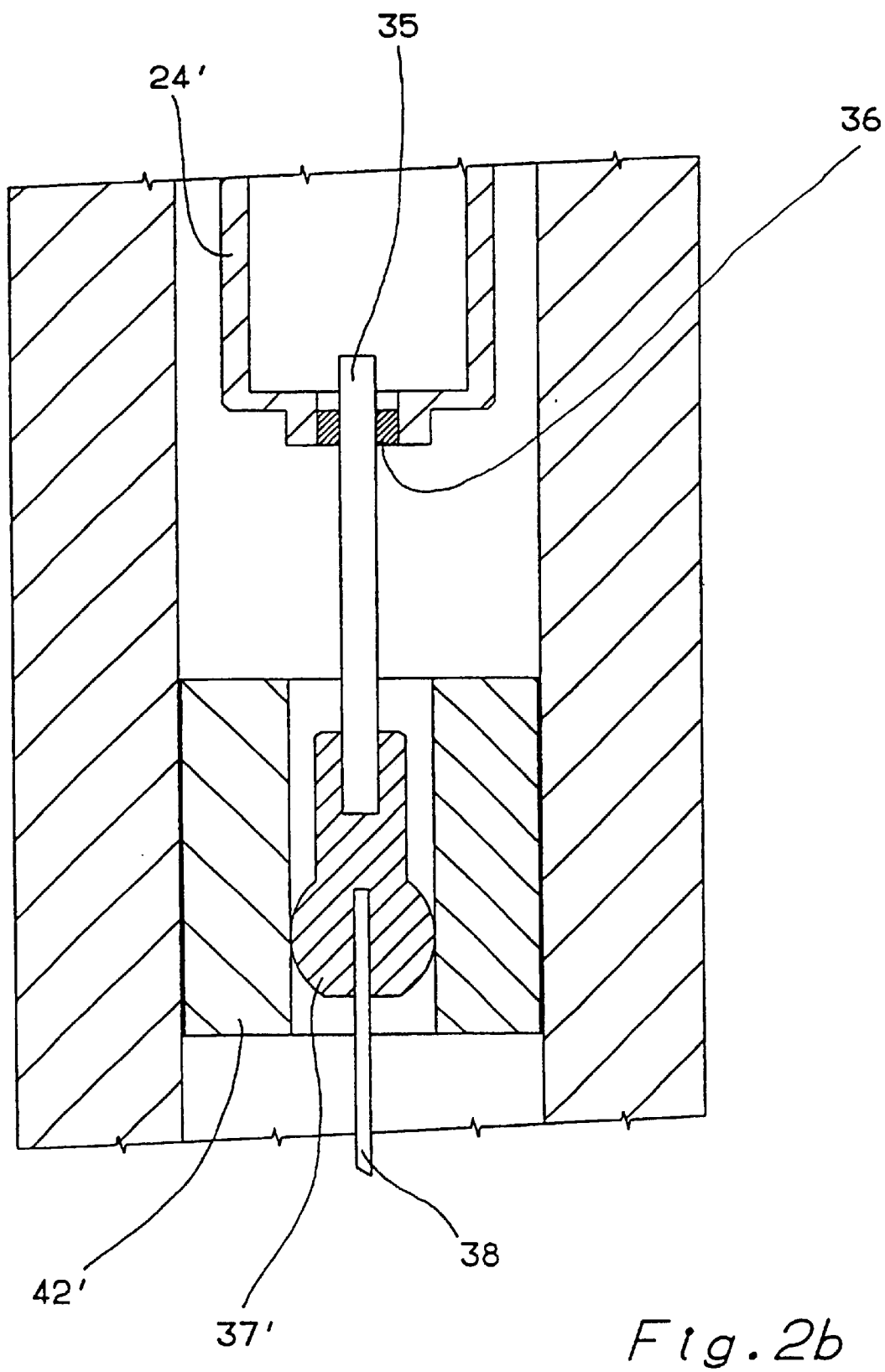
Figure 2C:
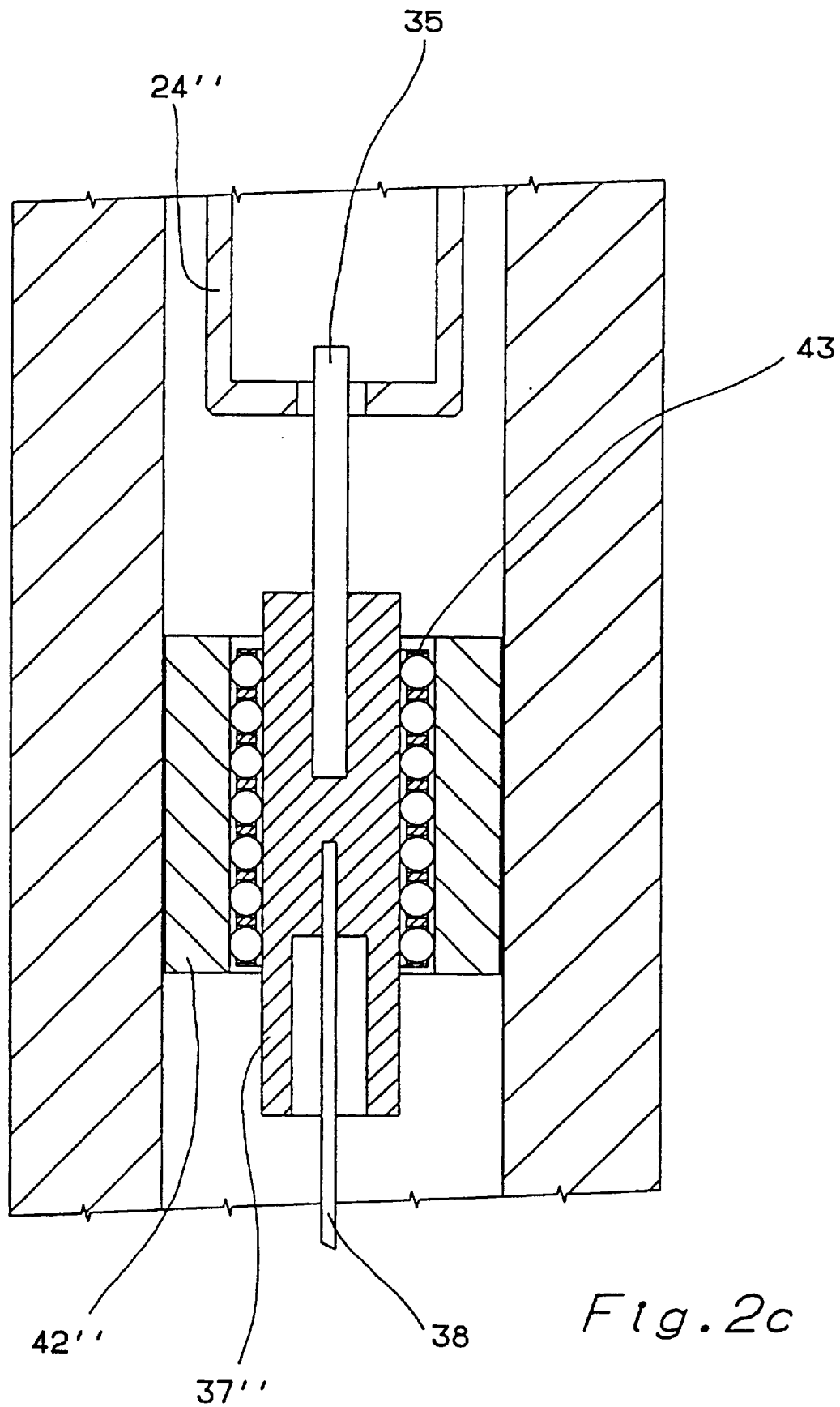

FIGS. 2a, 2b and 2c show how, in order to guide in a more accurate way axial displacements of stem 35—by limiting the length of its free portion—and to dampen possible vibrations of wire 38, different (or supplemental) guide devices are provided. In particular, in the embodiment of FIG. 2a, in addition to one of the two bushings 36 there can be foreseen a guide 42, made of antifriction material, at the interior of which coupling element 37 slides. Guide 42 is coupled to casing 24.

FIG. 2b shows a different coupling element 37' including a substantially spherical surface, that slides in a guide 42' coupled to portion 2 of the casing 1. FIG. 2c shows a substantially cylindrical coupling element 37" housed in a guide 42" coupled to portion 2. A ball bearing 43 is arranged between the coupling element 37" and tie guide 42", and no bushings 36 are fixed to the casing 24.

The guide devices according to FIGS. 2b and 2c guarantee a guiding action involving particularly low friction and stresses.

It is pointed out that, in FIGS. 2b and 2c, portion 2 of the casing 1 and casings 24' and 24" are very schematically shown for the sake of simplicity. In particular, casings 24' and 24" are not substantially different with respect to casings 24 of FIG. 1.

It can be readily understood that the head shown in FIG. 1 can be modified in such a way as to eliminate stem 35, so that the upper end of wire 38 is free and can directly act on small ball 27.

The figures from 3 to 5 show some details of a different microswitch 23' of a contact detecting head otherwise substantially identical to the one shown in FIG. 1.

In microswitch 23' there is not foreseen an axial thrust spring.

Wire 38' has its upper end directly secured to small ball 27'.

At the interior of the insulating element 25', located in casing 24' of microswitch 23', there are secured two stationary electrodes, or conducting bars, 45 and 46 electrically insulated that, together with small ball 27' and conductors not shown in the drawings, can close a detecting circuit. The bars 45 and 46 are arranged parallel with respect to the longitudinal geometric axis and side by side in a transversal direction.

A shaped element 49 made from insulating material (for example, ceramic) is also internally secured to insulating element 25' of microswitch 23', substantially at an intermediate position between conducting bars 45 and 46, and defines an abutment surface.

An elastic thin plate 48 has its upper end clamped to insulating element 25', and its free end specifically shaped for urging small ball 27' towards bars 45 and 46 in such a way as to close microswitch 23'. In order to facilitate the assembly, thin plate 48 has a window 50 and the end open.

It is obvious that microswitch 23' is set by operating threaded dowel 40, as in the embodiment shown in FIG. 1.

Upon contact occurring bet the feeler and the piece, and the subsequent displacing of wire 38' and thin plate 48, movable ball 27' is urged upwards, contacts shaped element 49 and disengages from at least one of stationary bars 45 and 46, thereby opening microswitch 23'. Then ball 27' slides on shaped element 49, urged towards the latter by thin plate 48, as shown with dashed lines in FIG. 3.

Figure 3:
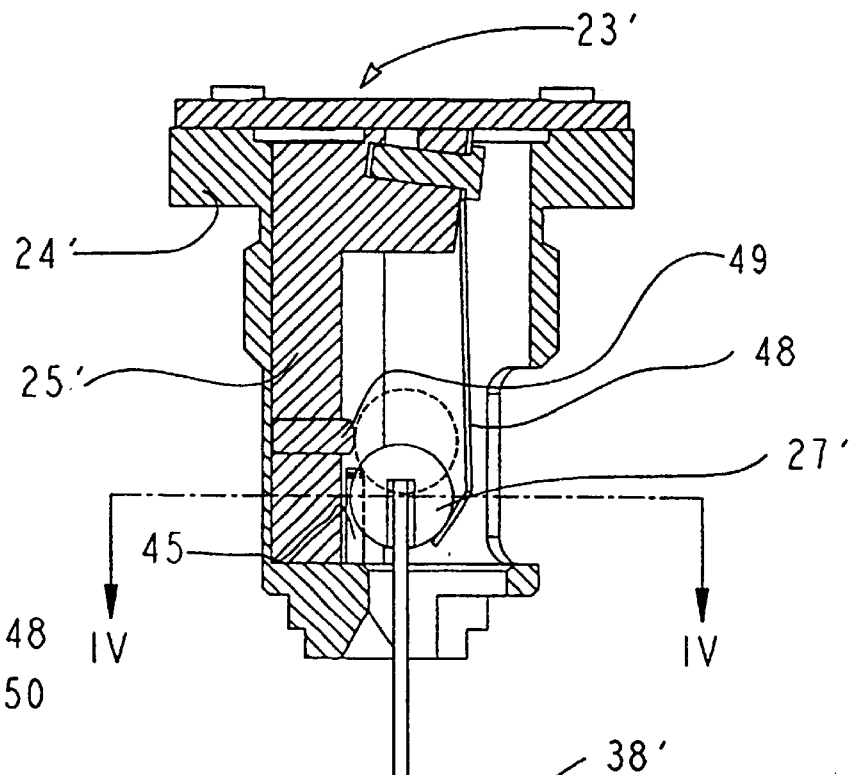
FIG. 3 schematically shows, in an enlarged scale with respect to that of FIG. 1, a longitudinal cross-sectional view of some components of the head of FIG. 1, according to a different embodiment of the invention.

Thus, in the head of FIG. 3, wire 38' does not undergo any compressive stress and, indeed, can undergo a slight tractive force.

Obviously, as the contact force on the feeler ceases, ball 27' engages again both bars 45 and 46.

The absence of elastic compressive stress on wire 38' is the reason for which the only shock waves being generated as a consequence of feeler 15 contacting the piece are just those due to spring 19 (FIG. 1), whereas in the probe of FIG. 1 even spring 26 of microswitch 23 generates shock waves.

However, these advantages with respect to the head of FIG. 1 imply a greater structural complexity, hence either of the two solutions can be chosen, depending on the circumstances (application conditions, costs involved, etc.).

Figure 5:
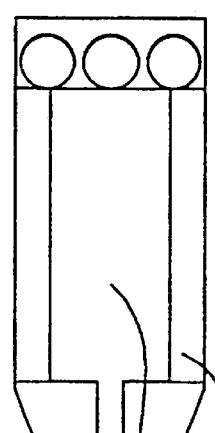
FIG. 5 shows a detail of the head of FIG. 3.
Figure 4:
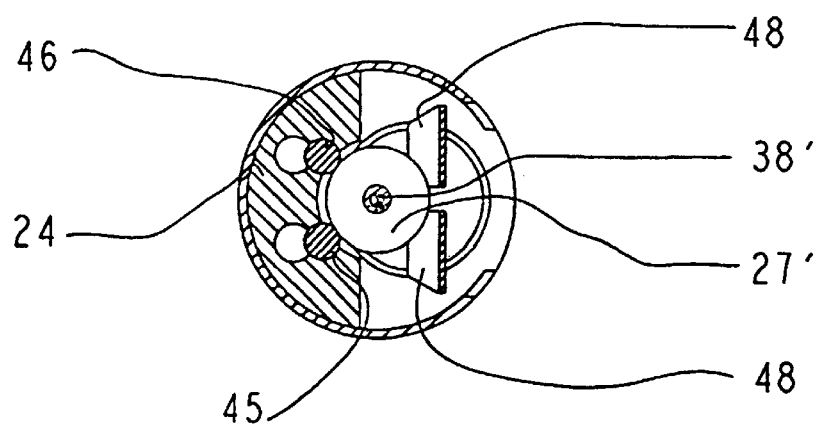
FIG. 4 is a cross-sectional view taken along the line IV—IV of FIG. 3.
Figure 6:
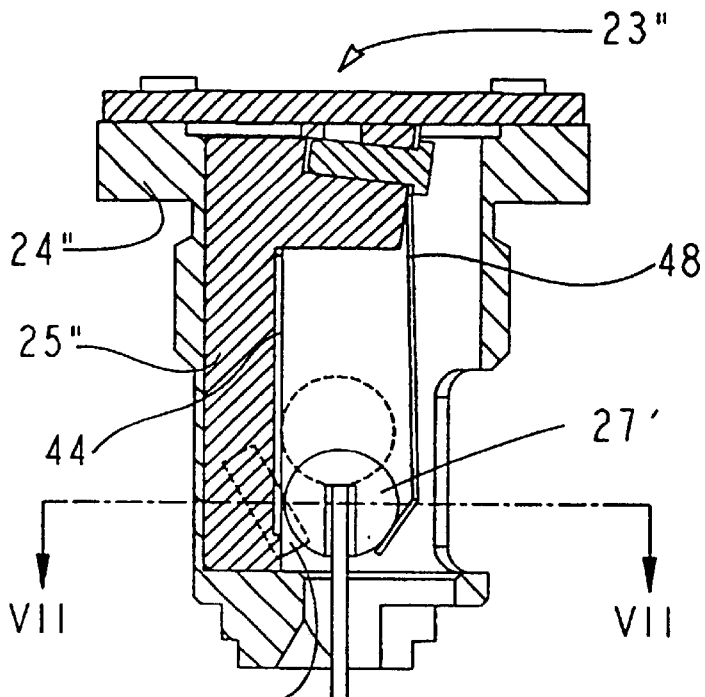
FIG. 6 is a variant of the components of the head shown in FIG. 3.
Figure 7:
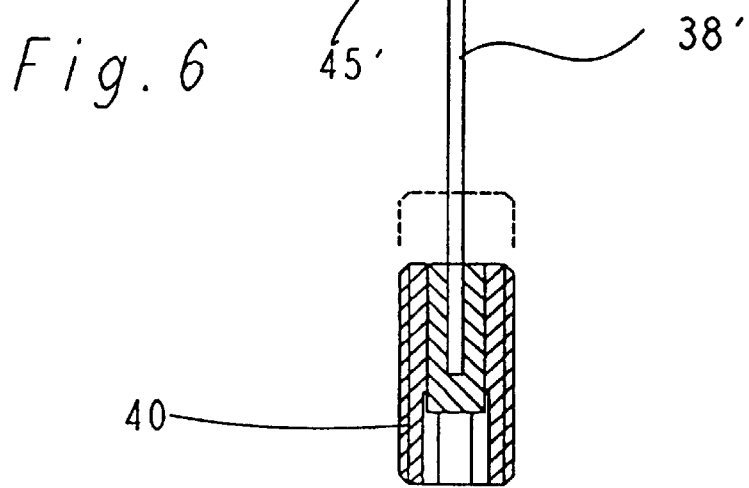
FIG. 7 is cross-sectional view taken along the line VII—VII of FIG. 6.
Figure 7:
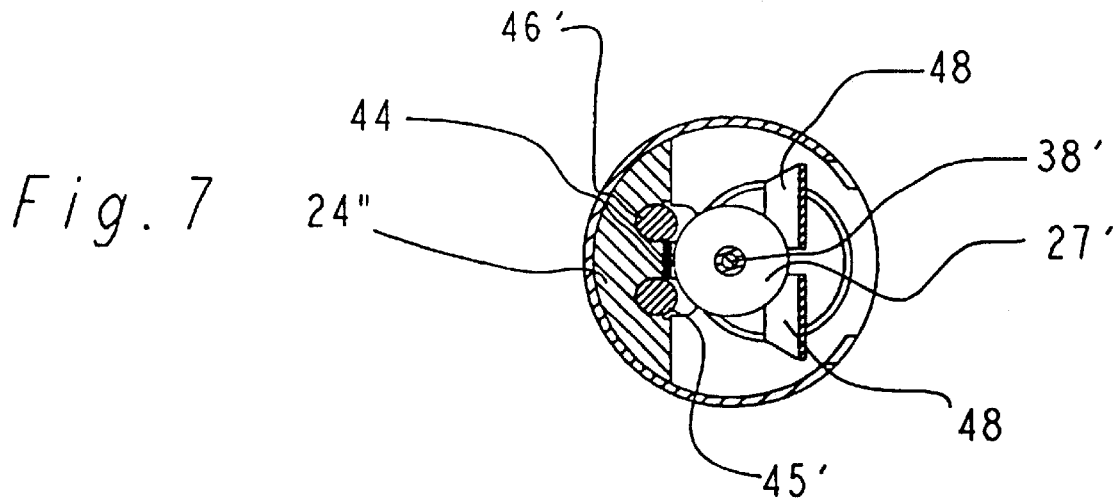

FIGS. 6 and 7 show a microswitch 23" with some variants with respect to the head of FIGS. 3 to 5. More specifically, conducting bars 45' and 46' are arranged in a direction that is inclined with respect to the longitudinal geometric axis. Moreover, a flat element or small plate 44 made of rigid, hard material, like ceramic, is internally fixed to insulating element 25" of casing 24" and defines a plane abutment surface arranged in the direction of the longitudinal geometric axis.

The operation of a head including microswitch 23" is substantially alike that described with reference to FIGS. 3, 4 and 5. More specifically, upon contact occurring between the feeler and the piece, the subsequent displacement of wire 38' and the thrust of thin plate 48, movable ball 27' displaces in the inclined direction defined by stationary bars 45' and 46' until it touches the plane surface of plate 44 and disengages from at least one of the formerly mentioned bars 45' and 46', thereby opening microswitch 23". Then ball 27' slides on the plane abutment surface of plate 44, urged towards it by thin plate 48, as shown with dashed lines in FIG. 6.

Figure 8:
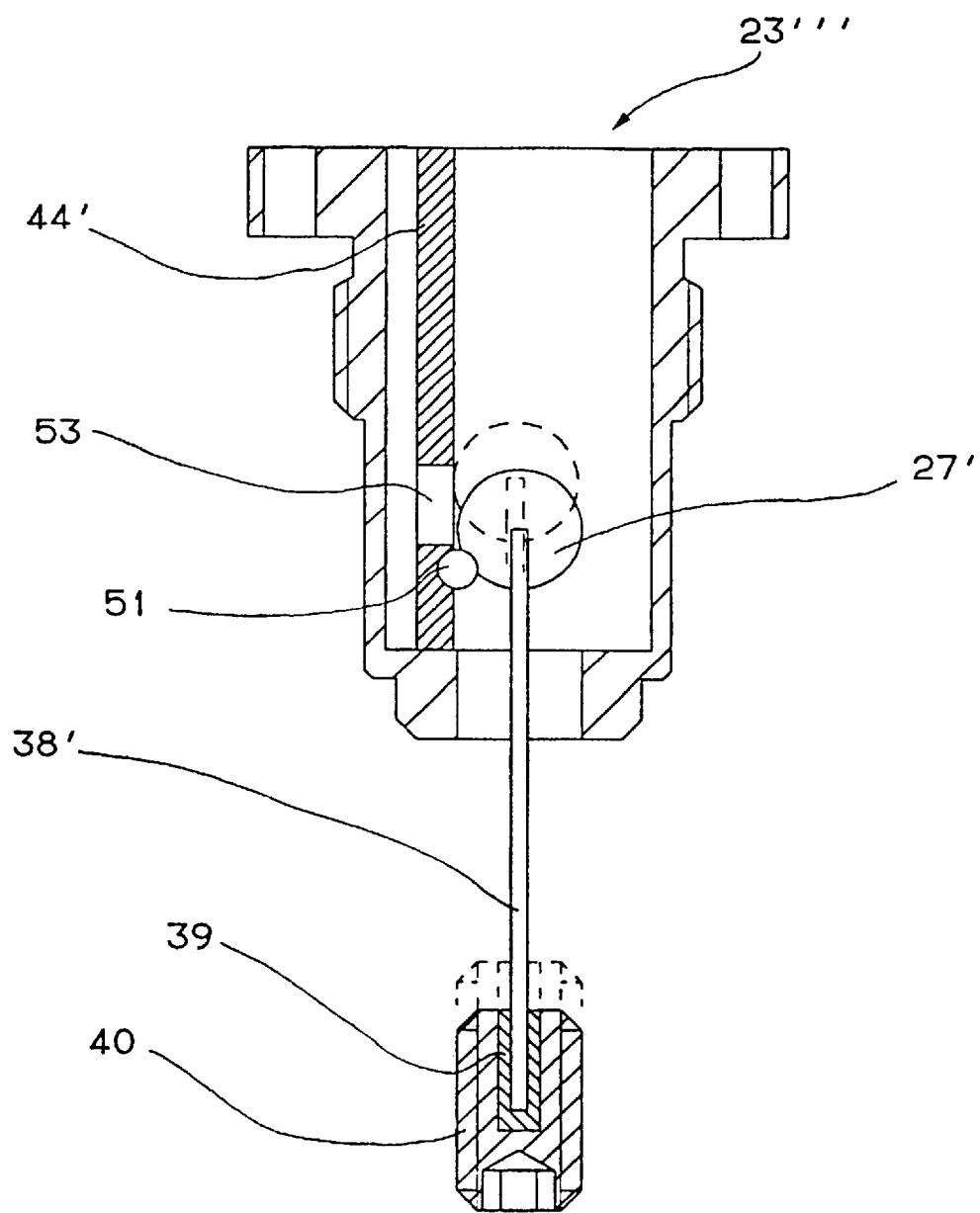
FIG. 8 shows a further variant of the components of the head shown in FIGS. 3 and 6.

FIG. 8 shows a microswitch 23'" with further variants with respect to the embodiments illustrated in figures from 3 to 7.

In microswitch 23'" shown in FIG. 8, small ball 27' is made of ferromagnetic material and, instead of being urged by an elastic thin plate towards the stationary contacts, consisting of two small balls (only one, 51, is shown in the figure), it is attracted towards them and towards the plane abutment surface of an insulating plate 44' by a magnetic disk, in particular a permanent magnet 53, set in plate 44'.

Figure 9:
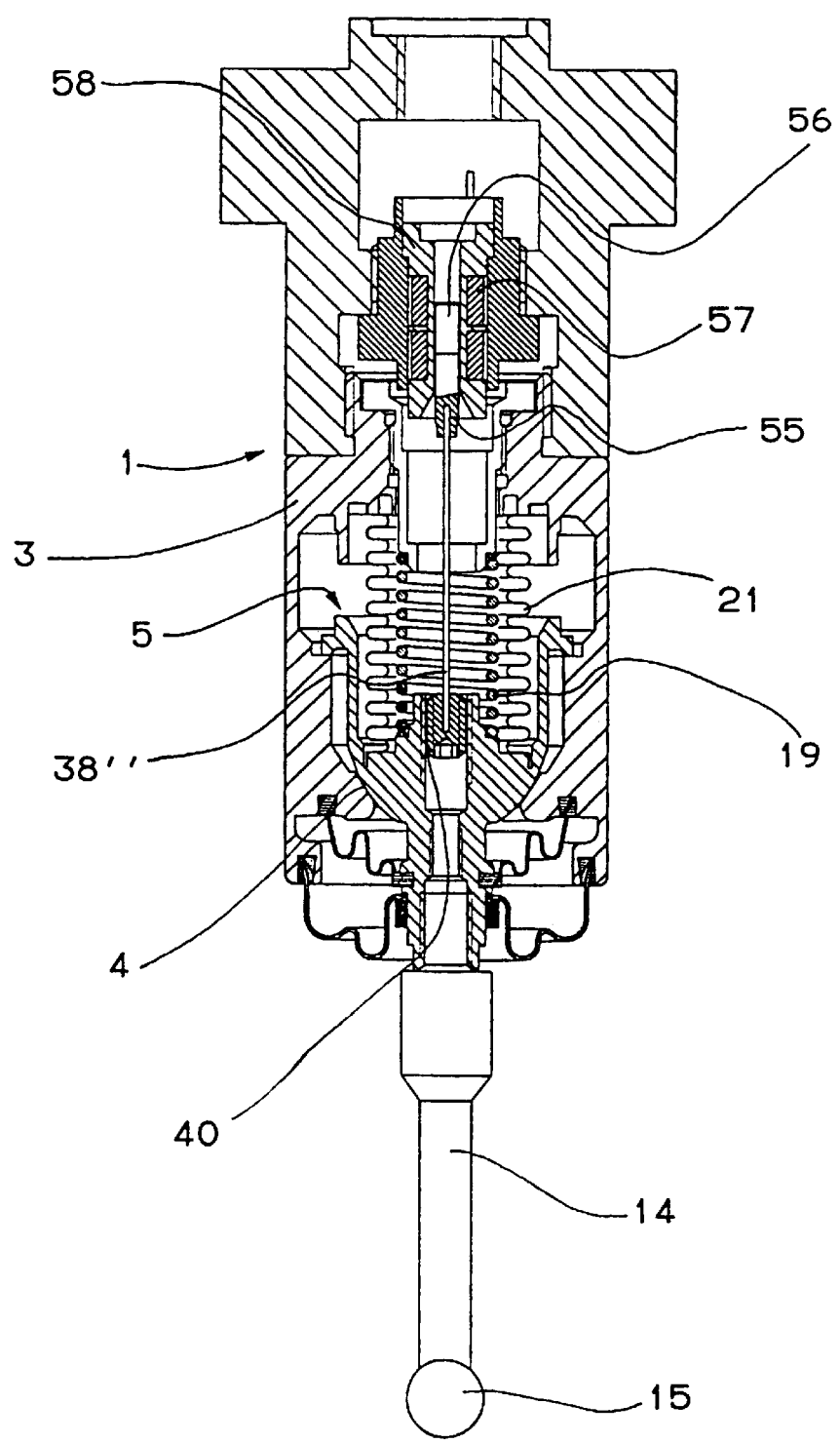
FIG. 9 is a longitudinal cross-sectional view of a measuring head according to a third embodiment of the invention.

The structure of the measuring head shown in FIG. 9 is to a great extent similar to that of the head of FIG. 1, except for the detecting device that includes a position transducer and the transmission wire that is connected in a different way.

The lower end of wire 38" is coupled to adjustment dowel 40 as described with reference to wire 38 shown in FIG. 1. The upper end of wire 38" is locked in a hole of a substantially cylindrical support 55 that carries in its central part a magnetic core 56, axially movable within electric windings 57 of an inductive position transducer. The windings 57 are formed in slots of a spool 58 that has an axial hole with a surface that acts as a guide for support 55 and thus for wire 38".

So, in the head shown in FIG. 9, wire 38" does not undergo significant compressive stresses or tractive forces.

It has been proved that the invention enables to achieve probes suitable for operating in a workshop environment, e.g. for applications in lathes and machining centers, with repeatability errors smaller than 0.2–0.3 m.

What is claimed is:

1. A head for the linear dimension checking of mechanical pieces, comprising a casing, that defines a longitudinal geometric axis, an arm-set, movable with respect to the casing, a feeler, coupled to movable arm-set, for touching the piece to be checked, a bias device, arranged between the casing and the movable arm-set, a detecting device, coupled to the casing, including a movable element, and a transmission device, between the movable arm-set and the movable element of the detecting device, including a wire, substantially rigid in said longitudinal direction but flexible in the directions perpendicular to the longitudinal direction, the wire having a first end coupled to the movable arm-set and a second end for cooperating with the movable element of the detecting device, the bias device being arranged in such a way that it urges the movable arm-set into contact with the casing and does not apply a compressive stress onto the wire of the transmission device.

2. The head according to claim 1, wherein said head detects contact between said feeler and the piece, wherein said detecting device includes a microswitch with two stationary elements made of electrically conducting material, the movable element of the detecting device also being made of electrically conducting material and being adapted for contacting said two stationary elements.

3. The head according to claim 2, wherein said microswitch includes a thrust spring acting on said movable element, the latter having a spherical shape, said second end of the wire being adapted for contacting said movable element of the microswitch.

4. The head according to claim 2, wherein said microswitch includes a thrust spring acting on said movable element, the latter having a spherical shape, the microswitch including a movable stem and a device for guiding the stem in the direction of said longitudinal geometric axis, said stem having an end for contacting said movable element of the microswitch and the other end secured to said second end of the wire.

5. The head according to claim 1, wherein said detecting device includes a position transducer and the second end of the wire is secured to the movable element of the detecting device.

6. The head according to claim 1, wherein said movable arm-set and said casing include a constraining system substantially of the cone-ball type and two facing annular surfaces for providing a substantially point-to-point contact.

7. The head according to claim 6, further comprising a further constraining system between said movable arm-set and said casing for preventing rotations of the movable arm-set about said longitudinal geometric axis.

8. A head for the linear dimension checking of mechanical pieces, comprising:
- a casing, that defines a longitudinal geometric axis,
- an arm-set, movable with respect to the casing,
- a feeler, coupled to the movable arm-set, for touching the piece to be checked, the head detecting contact between the feeler and the piece,
- a bias device, arranged between the casing and the movable arm-set,
- a detecting device coupled to the casing, said detecting device including a microswitch with two stationary elements made of electrically conducting material, and a movable element having a spherical shape, for contracting the stationary elements, also made of electrically conducting material, and
- a transmission device, between the movable arm-set and the movable element of the microswitch, including a wire, substantially rigid in said longitudinal direction but flexible in directions perpendicular to the longitudinal direction, the wire having a first end coupled to the movable arm-set and a second end for cooperating with the, movable element of the microswitch, the bias device being arranged in such a way that it urges the movable arm-set into contact with the casing and does not apply a compressive stress onto the wire of the transmission device,
- wherein the microswitch includes a thrust spring acting on said movable element, a movable stem and a device for guiding the stem in the direction of said longitudinal geometric axis, said stem having an end for contacting said movable element of the microswitch, said wire being made of steel and the second end of the wire being secured to the stem of the microswitch by means of a coupling element.

9. The head according to claim 8, wherein said device for guiding the stem includes at least one bushing, arranged near said stationary elements and adapted to cooperate with the stem.

10. The head according to claim 8, wherein said device for guiding the stem includes a guide adapted to cooperate with said coupling element.

11. The head according to claim 10, wherein said coupling element includes a substantially spherical surface adapted to cooperate with said guide.

12. The head according to claim 10, wherein said device for guiding the stem includes a ball bearing arranged between the coupling element and the guide.

13. A head for the linear dimension checking of mechanical pieces, comprising:
- a casing, that defines a longitudinal geometric axis,
- an arm-set, movable with respect to the casing,
- a feeler, coupled to the movable arm-set, for touching the piece to be checked,
- a bias device, arranged between the casing and the movable arm-set,
- a detecting device, coupled to the casing, including a movable element, and
- a transmission device, between the movable arm-set and the movable element of the detecting device, including a wire, substantially rigid in said longitudinal direction but flexible in directions perpendicular to the longitudinal direction, the wire having a first end coupled to the movable arm-set and a second end for cooperating with the movable element of the detecting device, the bias device being arranged in such a way that it urges the movable arm-set into contact with the casing and does not apply a compressive stress onto the wire of the transmission device,
- wherein said first end of the wire is secured to the movable arm-set by means of a coupling device for enabling adjustments in the direction of said longitudinal geometric axis.

14. A head for the linear dimension checking of mechanical pieces, comprising:
- a casing, that defines a longitudinal geometric axis,
- an arm-set, movable with respect tot he casing,
- a feeler, coupled to the movable arm-set, for touching the piece to be checked, the head detecting contact between the feeler and the piece,
- a bias device, arranged between the casing and the movable arm-set,
- a detecting device coupled to the casing, said detecting device including a microswitch with two stationary elements made of electrically conducting material and a movable element, for contacting the stationary elements, also-made of electrically conducting material, and
- a transmission device, between the movable arm-set and the movable element of the microswitch, including a wire, substantially rigid in said longitudinal direction but flexible in directions perpendicular to the longitudinal direction, the wire having a first end coupled to the movable arm-set and a second end secured to the movable element of the microswitch, the bias device being arranged in such a way that it urges the movable arm-set into contact with the casing and does not apply a compressive stress onto the wire of the transmission device,
- wherein said microswitch includes a device for applying to the movable element a force in a direction substantially transverse with respect to said longitudinal axis for bringing the movable element into contact with the two stationary elements, said second end of the Wire being secured to the movable element of the microswitch.

15. The head according to claim 14, wherein said microswitch includes at least a stationary abutment surface, the movable element being adapted for touching—upon contact of the feeler with the piece—said abutment surface and disengaging from at least one of the two stationary elements.

16. The head according to claim 13, wherein said two stationary elements have substantially rotational symmetry and are arranged adjacent in a transversal direction, and substantially parallel with respect to said longitudinal geometric axis.

17. The head according to claim 1, wherein the microswitch includes a stationary, shaped element made from insulating material that defines said abutment surface.

18. The head according to claim 15, wherein said two stationary elements have substantially rotational symmetry and are arranged adjacent in a transversal direction, and substantially parallel with respect to each other in a direction that is inclined with respect to said longitudinal geometric axis.

19. The head according to claim 18, wherein the microswitch includes a flat element that defines said abutment surface, the abutment surface being substantially plane and arranged in the direction of said longitudinal geometric axis.

20. The head according to claim 15, wherein said two stationary elements have a substantially spherical shape and are arranged adjacent in a transversal direction.

21. The head according to claim 20, wherein the microswitch includes a flat element that defines said abutment surface, the abutment surface being substantially plane and arranged in the direction of said longitudinal geometric axis.

22. The head according to claim 14, wherein said device for applying a force to the movable element of the microswitch includes an elastic element.

23. The head according to claim 14, wherein said device for applying a force to the movable element of the microswitch applies a magnetic attractive force.

24. A head for the linear dimension checking of mechanical pieces, comprising:

a casing, that defines a longitudinal geometric axis, an arm-set, movable with respect to the casing, a feeler, coupled to the movable arm-set, for touching the piece to be checked, a bias device, arranged between the casing and the movable arm-set, a detecting device coupled to the casing, said detecting device including a position transducer including a movable element, and a transmission device, between the movable arm-set and the movable element of the position transducer, including a wire, substantially rigid in said longitudinal direction but flexible in directions perpendicular to the longitudinal direction, the wire having a first end coupled to the movable arm-set and a second end secured to the movable element of the position transducer, the bias device being arranged in such a way that it urges the movable arm-set into contact with the casing and does not apply a compressive stress onto the wire of the transmission device, wherein said position transducer includes stationary windings and the movable element of the transducer includes a magnetic core.

25. The head according to claim 24, wherein said position transducer includes a support and a spool that defines an axial hole for housing and guiding the support, the magnetic core and the stationary windings being coupled to said support and spool, respectively.

* * * * *

UNITED STATES PATENT AND TRADEMARK OFFICE
CERTIFICATE OF CORRECTION

PATENT NO. : 6,526,672 B1
DATED : March 4, 2003
INVENTOR(S) : Franco Danielli et al.

It is certified that error appears in the above-identified patent and that said Letters Patent is hereby corrected as shown below:

Column 5,
Line 25, "bet" should be changed to -- between --.

Signed and Sealed this

Twelfth Day of August, 2003

JAMES E. ROGAN
*Director of the United States Patent and Trademark Office*